US011506188B2

(12) United States Patent
Munk-Hansen

(10) Patent No.: US 11,506,188 B2
(45) Date of Patent: Nov. 22, 2022

(54) HATCH ARRANGEMENT FOR CLOSING AN OPENING IN A FLOOR OF A WIND TURBINE AND A WIND TURBINE

(71) Applicant: Siemens Gamesa Renewable Energy A/S, Brande (DK)

(72) Inventor: Thorkil Munk-Hansen, Fredericia (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 115 days.

(21) Appl. No.: 17/104,451

(22) Filed: Nov. 25, 2020

(65) Prior Publication Data
US 2021/0156366 A1 May 27, 2021

(30) Foreign Application Priority Data
Nov. 27, 2019 (EP) .................................... 19211795

(51) Int. Cl.
*F03D 80/80* (2016.01)
*E05D 15/58* (2006.01)
(Continued)

(52) U.S. Cl.
CPC ........... *F03D 80/88* (2016.05); *E05D 15/582* (2013.01); *E06B 3/5018* (2013.01); *E06B 5/00* (2013.01);
(Continued)

(58) Field of Classification Search
CPC .......... F03D 80/88; F03D 80/50; F03D 13/20; F03D 80/00; F03D 80/80; E05D 15/582;
(Continued)

(56) References Cited

U.S. PATENT DOCUMENTS

2010/0326769 A1* 12/2010 Cuccurullo ............... E06C 9/10
182/100
2014/0030111 A1* 1/2014 Kohne .................. E06B 9/0638
416/244 R
(Continued)

FOREIGN PATENT DOCUMENTS

JP 2001303866 A 10/2001
KR 20120025748 A 3/2012

OTHER PUBLICATIONS

Extended European Search Report in corresponding European Patent Application No. 19211795.0 dated Jun. 2, 2020. 7 pages.

*Primary Examiner* — Aaron R Eastman
(74) *Attorney, Agent, or Firm* — Schmeiser, Olsen & Watts LLP

(57) ABSTRACT

A hatch arrangement with at least one slidable hatch for closing an opening in a floor of a wind turbine including a first guiding device fixedly mountable to the floor and a second guiding device pivotably mountable to the floor, a first coupling means to guide the slidable hatch along a first guidance path in the first guiding device and a second coupling means to couple the slidable hatch at least pivotably to the second guiding device, wherein the slidable hatch is coupled to the first guiding device at a first position and to the second guiding device at a second position, wherein a movement of the slidable hatch from a closed position along the first guidance path results in a pivoting movement of the second guiding device and in a movement of the slidable hatch to an open position and vice versa is provided.

14 Claims, 11 Drawing Sheets

(51) Int. Cl.
*E06B 5/00* (2006.01)
*F03D 80/50* (2016.01)
*E06B 3/50* (2006.01)

(52) U.S. Cl.
CPC ........ *F03D 80/50* (2016.05); *E05Y 2201/684* (2013.01); *E05Y 2900/60* (2013.01)

(58) Field of Classification Search
CPC ... E06B 3/5018; E06B 5/00; E05Y 2201/684; E05Y 2900/60; F05B 2230/61; F05B 2240/14; F05B 2240/912; F05B 2240/916; Y02E 10/72; Y02E 10/728
See application file for complete search history.

(56) References Cited

U.S. PATENT DOCUMENTS

| | | | |
|---|---|---|---|
| 2015/0316024 A1* | 11/2015 | Larsen | F03D 80/50 104/106 |
| 2016/0195067 A1* | 7/2016 | Mathiasen | F03D 13/20 52/745.18 |
| 2019/0072078 A1* | 3/2019 | Munk-Hansen | F03D 80/88 |
| 2020/0199894 A1* | 6/2020 | Soerensen | E04G 21/3204 |
| 2021/0317813 A1* | 10/2021 | Schomacker | F03D 7/0204 |
| 2022/0127114 A1* | 4/2022 | Munk-Hansen | F03D 13/40 |

* cited by examiner

HATCH ARRANGEMENT FOR CLOSING AN OPENING IN A FLOOR OF A WIND TURBINE AND A WIND TURBINE

CROSS-REFERENCE TO RELATED APPLICATIONS

This application claims priority to European Patent Application No. 19211795.0, having a filing date of Nov. 27, 2019, the entire contents of which are hereby incorporated by reference.

FIELD OF THE TECHNOLOGY

The following relates to a hatch arrangement with at least one slidable hatch for closing an opening in a floor of a wind turbine. Furthermore, the following relates to a wind turbine.

BACKGROUND

Hatch arrangements of wind turbines are typically provided for openings in the floor of a nacelle or on platforms within a tower of the wind turbine. Respective openings are typically used to crane or hoist loads or components through the opening. In addition, such openings are often used as parts of access routes, e.g. leading from the entrance on the base of the wind turbine via working platforms into the nacelle.

Typically, such hatch arrangements comprise a hinged hatch to open and to close the respective opening, wherein the hatch can be pivoted around a horizontal pivot axis. In such systems, the opening has to be secured to prevent people or objects from falling down if the hinged hatch is in an open position. For this purpose, in many cases guardrails are used. The guardrail can be either fixedly or removably mounted on the floor aside the opening. The guardrail should be mounted before the hinged hatch is opened.

Assuming that the load to be lowered through the opening is initially lying on the floor, the load may be attached to hook or a wire of the crane. After the guardrail has been mounted and the hinged hatch has been opened, the load has to be hoisted over the guardrail by the crane. Next, the load can be lowered through the opening. The same procedure but vice versa is executed if the load is desired to be hoisted from a lower level through the opening.

Since the load has to be hoisted over the guardrail, there is the problem that the respective crane has to be higher or larger compared to the case that hoisting the load over the guardrail is not required. As a consequence, more space of the wind turbine is required for the respective crane.

Another problem is that, for time saving reasons, a user may just open the hatch without having mounted the guardrail and, hence, without securing the opening before. However, this misuse potentially leads to dangerous situations where the hatch is open and the respective opening is not secured. As already mentioned, another aspect is that, in many cases, the opening serves as a part of an access route. In this case, the guardrail is not an option at all or at least not practical, since the user wants to get access to the opening.

SUMMARY

An aspect relates to provide an enhanced hatch system, in particular to avoid the aforementioned problems associated with the securing of the respective opening and the hoisting of loads.

An aspect relates to a hatch arrangement as described above comprises a first guiding device which is fixedly mountable to the floor and a second guiding device which is pivotably mountable to the floor, wherein the hatch arrangement comprises a first coupling means to guide the slidable hatch along a first guidance path in the first guiding device and a second coupling means to couple the slidable hatch at least pivotably to the second guiding device, wherein the slidable hatch is coupled to the first guiding device at a first position and to the second guiding device at a second position, wherein the first position and the second position are located along a longitudinal direction of the slidable hatch and spaced apart from each other, wherein a movement of the slidable hatch from a closed, in particular horizontal, position along the first guidance path results in a pivoting movement of the second guiding device and in a movement of the slidable hatch to an open, in particular vertical, position and vice versa.

The first guiding means couples a lower side of the slidable hatch to the first guiding device at the first position, wherein lower and upper side refer to the open, in particular at least essentially vertical, position of the slidable hatch. The second guiding means couples the slidable hatch to the second guiding device at the second position, which is located between the first position and the upper side of the hinged hatch. The first position and the second position differ along the longitudinal direction of the slidable hatch. The first position and/or the second position can be at fixed positions regarding the slidable hatch.

The present invention is based on the idea that, for opening the slidable hatch, the lower side moves along the first guidance path of the first guiding device which is immovably attached to the floor, that is, stationary and non-pivotable. The second guiding device, however, can be pivoted around a pivot axis, which is, in particular, a horizontal axis perpendicular to the longitudinal direction of the slidable hatch. If the slidable hatch is in the closed position, the second guiding device is in a horizontal or lying orientation. Since the two coupling positions, where the slidable hatch is coupled to the guiding devices, are located differently regarding the longitudinal direction of the slidable hatch, the movement of the first position along the first guidance path, in particular in a direction towards the second position, causes the second guiding device to pivot into a vertical or standing orientation. As a consequence, the movement of the second position and, hence, of the upper side of the slidable hatch is defined by the movement along the first guidance path of the first guiding device and the pivoting movement of the second guidance device. In summary, the lower side of the slidable hatch moves along the floor and the upper side is lifted to finally bring the slidable hatch into the open, in particular vertical, position.

In the closed position, the slidable hatch is horizontally arranged or lies over the opening. In this position, the second guiding device is also in a horizontal position. The angle between the second guiding device and the floor can be from 0° to 30°, between 5° and 20°, such that the pivoting movement of the second guiding device can be initiated when the first position starts to move along the first guidance path. Hence, if the guidable hatch is closed, the second guiding device arranged in a space-saving and secure way. In the open or standing position, the slidable hatch and the second guiding device is vertical to the floor. In this position, the slidable hatch is arranged in a standing state, in particular with an angle to the floor between 80° and 100°.

To initiate and perform the opening movement of the slidable hatch, the user typically pulls the slidable hatch from the closed into the opened position while he is standing adjacent to the upper side of the slidable hatch. Hence, one advantage of the hatch arrangement according to the present invention is that the slidable hatch automatically forms, after opening it, a protective wall towards the side of the opening where the user is standing. Hence, the slidable hatch acts as a protective wall for the side where the user is standing. As a consequence, a separate securing device like a guardrail or the like is, at least at this side of the opening, not required. Additionally, the user is not required bow over the hatch, like with hinged hatches, but can operate the slidable hatch at the near side.

Another advantage of the present invention is that the load to be lowered through the opening can be positioned above the slidable hatch while it is still in the closed position. Compared to a hinged hatch, the space required above the hatch to bring the slidable hatch from the closed into the open position, that is to open the hatch, is much less. In other words, the space swept by the slidable hatch is less than the space swept by a hinged hatch while opening the hatch. Thus, the load can be brought over the opening quite close to the slidable hatch, even if it is still in the closed position. The load does not disturb or block the opening of the slidable hatch, since the hatch slides along below the load. Additionally, since there is no guardrail required at least at the side of the opening where the slidable hatch is located in the open position, there is no need to hoist the load over a guardrail. The respective crane can be much smaller than for a traditional hatch arrangement comprising only a hinged hatch and/or with guardrails.

As a consequence, the slidable hatch can replace the guardrail on the side where the hatch is located in its open position. Another consequence is that a kickplate, which is typically provided at the bottom of the guardrail, is not necessary any more. Such kickplates are used for traditional hatch arrangements to protect objects lying on the floor like tools or the like from falling down through the opening after passing through the guardrail.

In summary and other words, the present invention concerns a hatch arrangement for a floor in a wind turbine, comprising
  a slidable hatch for closing an opening in the floor,
  a first guiding device fixedly mountable to the floor, wherein the slidable hatch is guided along a first guidance path in the first guiding device at a first position along a longitudinal direction of the slidable hatch, and
  a second guiding device pivotably mountable to the floor, to which the slidable hatch is coupled at least pivotably at a second position along the longitudinal direction of the slidable hatch, which is spaced apart from the first position,
  wherein movement of the slidable hatch from a closed, in particular horizontal, position along the first guidance path results in a pivoting motion of the second guiding device and the slidable hatch to an open, in particular vertical, position of the slidable hatch.

In embodiments, the second coupling means can be adapted to couple the slidable hatch only pivotably to the second guiding device, meaning that the second position is a fixed position with respect to the slidable hatch and to the second guiding device. In this embodiment, the movement of opening and closing the hatch arrangement comprises only one degree of freedom regarding the relative position of the slidable hatch and the second guiding device.

However, in a preferred embodiment of the present invention, the second guiding device comprises a second guidance path, wherein the second coupling means is further adapted to guide the slidable hatch along the second guidance path at the second position. In this embodiment, the first coupling means and the second coupling means couple the slidable hatch to the respective guiding device, wherein the coupling means guide the slidable hatch pivotably along the respective guidance path.

The first guidance path comprises a first section and a second section, wherein a movement of the slidable hatch along the first section from a closed position results in a transmission of force from the slidable hatch to the second guiding device using the second coupling means which is located at an end stop of the second guidance path, wherein the force causes the second guiding device to pivot from a first, in particular horizontal, orientation into a second, in particular vertical, orientation, wherein the hatch arrangement comprises a stopper which defines the second orientation as the position where the stopper blocks the second guiding device with respect to its pivoting movement, wherein the movement of the slidable hatch along the second section results in a movement of the second coupling means along the second guidance path while the second guiding device remains in the second orientation.

During the movement of the first position along the first section, the movement of the second position is only defined by the pivoting motion of the second guiding device. Hence, the movement of the second position can, with respect to a fixed coordinate system regarding the wind turbine, be described by a circle centered on the pivot axis of the second guiding device during this phase. In other words, in the closed position of the slidable hatch, the second coupling means are arranged at an end stop of the second guiding path and the first coupling means are arranged at one end, in particular end stop, of the first guiding path, wherein the guiding paths extend in opposite directions. Hence, if the first position moves along the first guiding path due to, for example, a user pulling the slidable hatch, a force acts from the second guiding means on the end stop of the second guidance path, causing a pivoting motion of the second guiding device at least as long as the longitudinal direction of the slidable hatch, in which the force acts, and the guiding direction of the second guiding path form an obtuse angle. This angle is equal to the larger of the two angles between the second guidance path and the longitudinal direction of the slidable hatch.

While the first and the second section may be directly adjacent, an intermediate section is also conceivable, wherein an acute angle between the force direction and the free direction of the second guiding path leads to a split of the motion into a the completion of the pivoting to the stopper and some translational movement along the second guiding path; however, gravity may also be a factor preventing translational movement.

Once the first position has reached the second section, the second guiding device does not pivot any more, such that the movement of the second position is solely defined by the movement of the second guiding means along the second guidance path, in particular until at least one end stopper of the first and/or second guiding path is reached. This second guiding path may describe a straight line.

Next, the opening and closing mechanism of the hatch arrangement according to this embodiment will be described in more detail. First, the slidable hatch is in the closed position, where the second guiding device is in the first orientation. In this situation, the second coupling means is located at the end stop of the second guidance path, for example at the end of a respective groove within the second guiding device.

To open the slidable hatch, the user stands, as already mentioned, adjacent to the upper side of the slidable hatch and pulls the slidable hatch towards himself and in particular also slightly upwards. To provide better handling, the slidable hatch can comprise a handle or the like. As a consequence, the first guiding means will start moving along the first section of the first guidance path. Since the angle between the force acting along the longitudinal direction of the slidable hatch and free direction of the second guiding path is between 90° and 180°, the second guiding means will push against the end stop of the second guiding device, which leads the second guiding device to pivot from the first orientation towards the second orientation without any movement of the second guiding means along the second guiding path. In embodiments, even before the second guiding device reaches the second orientation, the angle between the slidable hatch and the second guiding device becomes 90° and possibly even smaller. However, the weight of the slidable hatch, which consists of metal and/or plastics or other suitable materials, may be large enough that the second guiding means still rests at the end stop of the second guidance path, although, since the angle between the slidable hatch and the second guiding device is less than 90°, a component of the force acting on the second guiding path points into the free direction of the second guidance path.

Once the second guiding device has reached the second orientation, it is in a vertical position, wherein the further pivoting movement of the second guiding device is blocked by the stopper. The stopper can be a block-like element which is attached to the floor and located at the position where the second guiding device is coupled to the floor by a pivot joint. In particular, the stopper may form a part of the pivot joint.

During the movement of the first guiding means along the second section of the first guidance path, the second guiding device cannot perform a further pivoting movement, since it is blocked by the stopper. As a consequence, the second guiding means leaves the end stop of the second guidance path and moves along the second guidance path into the mainly vertical direction until the hinged hatch is in the open position, presuming the user applies the corresponding force surpassing gravity.

In this embodiment, during the movement of the first guiding means along the first section of the first guidance path, the slidable hatch mainly moves along its longitudinal direction towards to the user who pulls on the slidable hatch. Hence, the user keeps or increases the distance between himself and the opening, which reduces the risk for him to fall down through the opening. During the movement of the first coupling means along the second section of the first guidance path, the slidable hatch mainly performs the pivoting movement into the mainly vertical position. Hence, the slidable hatch acts as a securing device to prevent the user from falling into the opening.

Although the first guidance path can be divided into the first section and the second section, it is possible that between the first section and the second section is an intermediate section. In the intermediate section, the second coupling means already moves along the second guidance path while the second guiding device still pivots towards the second orientation. The intermediate section can be defined by an acute angle between the slidable hatch and the second guiding device, in particular between the force acting on the second guiding device via the second coupling means and the free direction of the second guiding path, wherein the component of the force at the second guiding means caused by the user is large enough to overcome the gravitational force of the slidable hatch which causes the second guiding means to start its movement along the second guidance path.

The second guiding device can comprise two second guiding rails which are pivotably mountable on the floor such that the second guiding rails are pivotable around a horizontal pivot axis, which is in particular perpendicular to the first guidance path, wherein the second coupling means comprises two second sliders arranged on two opposite sides of the slidable hatch, wherein each second slider is movable along one of the second guiding rails. The second guiding rails can be hollow. In particular, the second guiding rails can comprise a U-shaped cross section, wherein the end-sections of the U-shape comprise two protrusions which are opposed to each other and which face each other, such that a C-like shape results. The protrusions hold the second sliders within the U-shape of the second guiding rails securely. In another embodiment, the second guiding rails comprise a bar-like structure, wherein the second sliders engage around the respective second guiding rail. The second sliders can move along the second guidance path by oil lubrication and/or by wheels or rolls or the like of the second sliders. The second sliders can be a part of the slidable hatch or separate components of the hatch arrangement.

The second coupling means can comprise a holding component which is attached to the slidable hatch, wherein the holding component is pivotably coupled to the respective slider. Hence, by means of the second sliders, the slidable hatch can be moved along the second guidance path of the second guiding device. Furthermore, the sliders allow for the pivoting motion of the slidable hatch with respect to the second guiding device. The position of the holding component along the longitudinal direction of the slidable hatch may define the second position.

In a preferred embodiment of the present invention, the first guiding device comprises two, in particular hollow, first guiding rails which are fixedly mountable parallel to each other laterally on two opposite sides of the opening, wherein the first coupling means comprises two first sliders which are arranged on two adjacent corners of the slidable hatch, wherein each first slider is movable along one of the first guiding rails. The first guiding rails can comprise a U-shaped cross section, wherein the end-sections of the U-shape comprise two opposed protrusions facing each other to securely hold the first sliders within the U-shape of the first guiding rails, resulting in a C-like shape. In another embodiment, the first guiding rails comprise a bar-like structure, wherein the first sliders engage around the respective first guiding rail. The first sliders can move along the first guidance path by oil lubrication and/or by wheels or rolls or the like of the first sliders. The first sliders can be a part of the slidable hatch or separate components of the hatch arrangement. As explained above regarding the second coupling means, the first coupling means may also comprise holding components.

In a preferred embodiment of the invention, the hatch arrangement additionally comprises a hinged hatch which is pivotably mountable to the floor, wherein the hinged hatch can be brought from a closed, in particular horizontal, position into an open, in particular vertical, position and vice versa by pivoting the hinged hatch around a pivot axis of the hinged hatch, wherein the slidable hatch and the hinged hatch are, if they are both in the open position, located on opposite sides of the opening. The slidable hatch is arranged below the hinged hatch if the slidable hatch and the hinged hatch are both in the closed position. Since the slidable hatch and the hinged hatch are located on opposite sides of the opening if they are both open, the slidable hatch as well as the hinged hatch act as a securing device and prevent people and/or objects from falling down into the opening from the respective side.

To lower a load through the opening, as a first step the hinged hatch can be brought into the open position. Next, the respective load can be brought over the opening which is still secured by the closed slidable hatch. Providing the slidable hatch and the hinged hatch, thus, realises a second security level of the hatch arrangement. Next, the slidable hatch can be opened as described above and the load can be hoisted.

In a preferred embodiment of the invention, the slidable hatch, and in particular the or a hinged hatch, comprises a hatch opening for a wire in the closed position. The hatch opening can be a lateral slit allowing the respective hatch to be opened and closed even when a wire passes through the respective hatch opening. If several hatch arrangements are located one upon the other along a vertical line within the wind turbine and a crane is located above the uppermost hatch arrangement, the wire of this crane can pass through the hatch opening which allows the usage of the crane for the lower hatch arrangements, while the uppermost hatch arrangement can be closed and the respective opening is secured.

The hatch arrangement can comprise at least one elastic means, in particular in or at the first and/or the second guiding device, wherein closing the slidable hatch leads to an elastic deformation of the elastic means against the elastic force of the elastic means. Since the slidable hatch as well as the second guiding device changes from a mainly vertical into a mainly horizontal position while bringing the hatch arrangement from the open into the closed position, potential energy of these components is released when the slidable hatch is closed. To conserve this energy at least partially, the elastic means is deformed during the closing process, wherein the elastic means is loaded by deformation energy.

One advantage in this embodiment is that closing the slidable hatch happens much softer compared to the case that the gravitational force of the respective components is not at least partially compensated by the elastic force of the elastic means. Hence, it is not possible to slam the slidable hatch in this embodiment. The elastic means can be a spring which is located in the first guidance path between the end stop of the first guidance path and the first guiding means. In this embodiment, if the first guiding means runs against the end stop of the first guidance path, the respective spring can be compressed and charged with respective energy. Alternatively or additionally, a second elastic means, e.g. a second spring, can be located in the second guidance path between the second guiding means and the end stop of the second guidance path. Closing the hinged hatch, in particular while the first guiding means moves along the second section of the first guidance path, leads to a compression of the second spring and, hence, to a respective conservation of energy.

If the user wants to open the hinged hatch, the elastic forces of the first spring and the second spring support this. Hence, the slidable hatch can be opened with less effort. The parameters of the elastic means, in particular the spring stiffness, can be chosen such that the potential energy of the slidable hatch in the open position with respect to the closed position exceeds the deformation energy that can be stored in the elastic means. Hence, the slidable hatch automatically changes from the open into the closed position after the closing of the slidable hatch has been initiated.

The hinged hatch of the hatch arrangement can comprise a further elastic means, wherein closing the hinged hatch leads to an elastic deformation of the further elastic means against the elastic force of the further elastic means. The further elastic means can be a leg spring or the like which is located at the pivot joint of the hinged hatch.

Additionally or alternatively to the elastic means, the hatch arrangement according to the present invention can comprise a, in particular electrical and/or hydraulic, driving means to bring the slidable hatch from the closed position into the open position and vice versa. The driving means or further driving means can also be provided for the hinged hatch. In this embodiment, the slidable hatch can comprise a control device on the upper side, wherein the user can initiate opening or closing the slidable hatch by a respective key stroke.

In a preferred embodiment of the present invention, the hatch arrangement comprises a holding means, wherein the holding means is adapted to hold the slidable hatch in the open position. The holding means ensures that the slidable hatch does not unintentionally fall down from the open into the closed position. The holding means can be or comprise a clamping means and/or a locking means and/or a latching means. In another embodiment, the holding means can be a lateral recess of the first guidance path, namely at the position where the first position is located while the slidable hatch is in the open position. The lateral recess can be U-shaped such that the first guiding means latches into the lateral recess once the slidable hatch has reached the open position. To close the slidable hatch, the user has to pull the slidable hatch a bit upwards to release the first guiding means from the holding means. To initiate the closing of the slidable hatch, the user then has to push against the lower side of the slidable hatch to initiate the movement of the first guiding means along the first guidance path. The slidable hatch automatically changes from the open into the closed position if the holding means has been opened or the first guiding means has been released from the respective lateral recess.

In analogy to this, the hatch arrangement can comprise a further holding means, in particular a further clamping means and/or latching means, to hold the hinged hatch in the open position.

Furthermore, the present invention relates to a wind turbine comprising at least one hatch arrangement according to the present invention. All features of the hatch arrangement according to the present invention and respective advantages also apply to the wind turbine and vice versa.

The opening is arranged on a floor of a nacelle and/or on a platform within a tower of the wind turbine. Typically, within the tower of the wind turbine several working platforms are provided for maintenance work or as parts of an access route, e.g. into the nacelle of the wind turbine.

The wind turbine can comprise several hatch arrangements, wherein each of the hatch arrangements is designated to a certain opening, wherein the openings and, hence, the hatch arrangements are arranged above each other along a vertical line. In this embodiment, a single crane which is located above the uppermost hatch arrangement can be used to hoist loads through each of the openings.

In an especially preferred embodiment, the slidable hatch and a or the hinged hatch are located on two opposite sides of the opening in their respective opening positions, wherein on each of the two other opposing sides a component of the wind turbine is located, wherein each of the components prevents a person to fall into the opening from the respective side. The component of the wind turbine may be an electric cubicle. Hence, the two sides of the opening with the respective components are secured by the components. If the load is desired to be craned through the opening, the hinged hatch can be opened, wherein the hinged hatch acts as a securing device towards the respective side of the opening. In this situation, only the side where the slidable hatch will be located in the open position is not secured yet. This side can be used to position the load over the opening. After this, the slidable hatch can be opened, wherein the slidable hatch acts as a securing device for the last of the four sides of the opening. In this situation, all four sides of the opening are secured by the components of the wind turbine and the two hatches.

To avoid remaining open gaps between the components of the wind turbine and the hinged hatch being in the open position, the hinged hatch may comprise two lateral side walls to close these gaps. To close these gaps completely, the side walls can have a width in the order of decimetres, for example 1 to 5 decimetres. In the closed position of the hinged hatch, the side walls can laterally cover the other components of the hatch arrangement, in particular the hinged hatch and the guiding devices.

BRIEF DESCRIPTION

Some of the embodiments will be described in detail, with reference to the following figures, wherein like designations denote like members, wherein.

DETAILED DESCRIPTION

Figure 1:
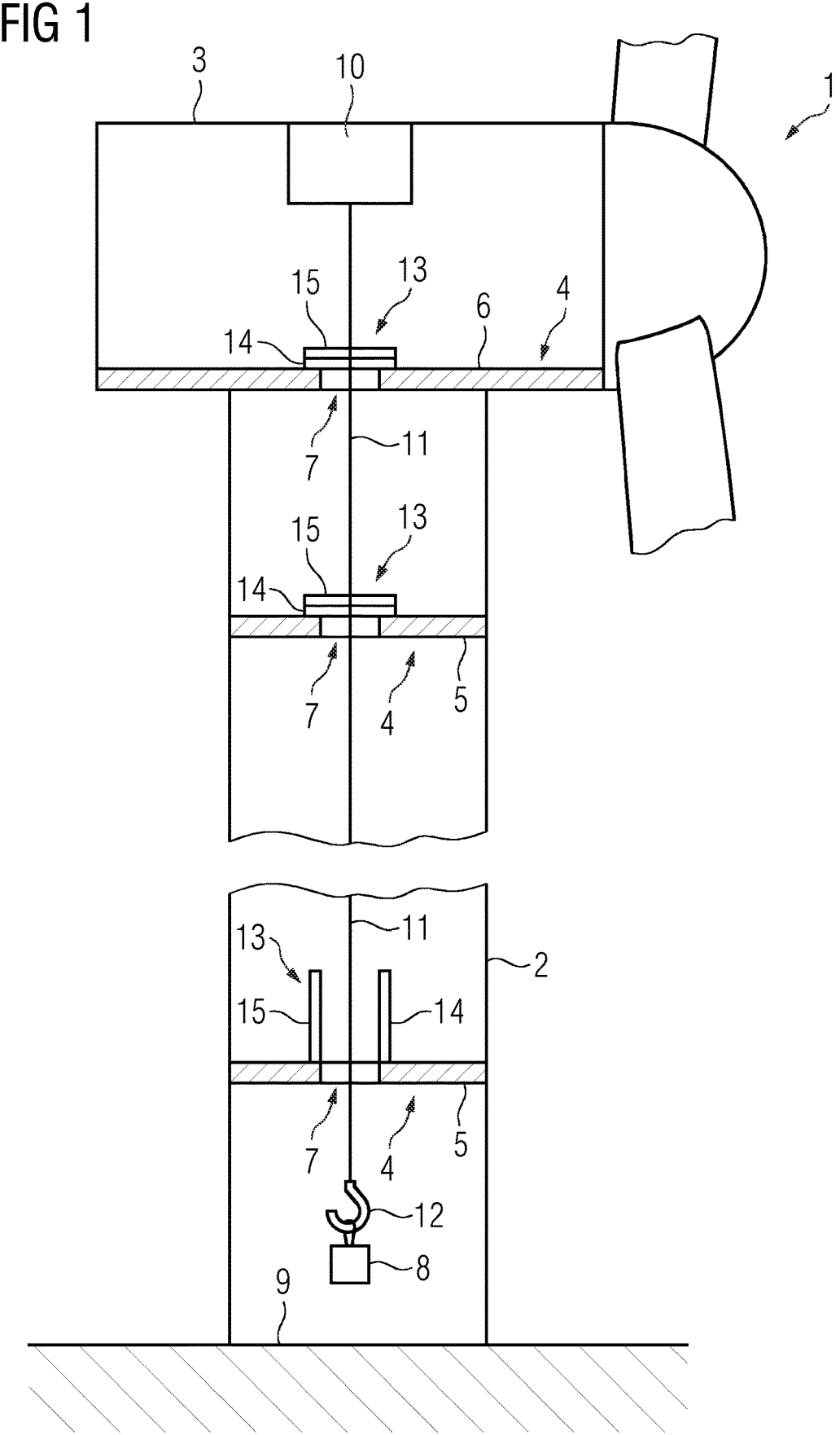
FIG. 1 depicts an embodiment of a wind turbine comprising several hatch arrangements.

FIG. 1 shows a longitudinal cut through a wind turbine 1 according to the present invention. The wind turbine 1 comprises a tower 2 and a nacelle 3 which is located on top of the tower 2 and houses components of the wind turbine 1, like an electric generator and others. The wind turbine 1 further comprises several floors 4, namely several working platforms 5 within the tower 2 and a nacelle floor 6. Each of the floors 4 comprises an opening 7. The openings 7 are provided to crane loads 8, e.g. from one of the floors 4 to another, or from or to a base 9 of the wind turbine 1. Optionally, the openings 7 can be parts of an access path of the wind turbine 1, e.g. from the base 9 via the working platforms 5 to the nacelle 3.

To crane, i.e. to hoist or to lower, the load 8 through the respective opening 7, a crane 10 is provided which is exemplarily located in the nacelle 3. The crane 10 comprises a wire 11 with a hook 12 to hoist/lower the load 8. Since the openings 7 are located above each other along a vertical line and the crane 10 is located above the openings 7, the crane 10 can be used as a common means to crane loads between the base 9, the working platforms 5 and the nacelle 3. However, several cranes on several platforms 5 or the nacelle 3, respectively, can be provided.

The wind turbine 1 comprises several hatch arrangements 13 according to the present invention, wherein the hatch arrangements 13 are adapted to open and close the respective opening 7. While not in use, e.g. while no load 8 is desired to be craned through one of the openings 7, the respective hatch arrangement 13 is closed to prevent persons or objects from falling down through the openings 7 unintentionally. However, if the load 8 is supposed to be craned through the opening 7, the respective hatch arrangement 13 can be brought into an open state. In FIG. 1, the hatch arrangement 13 of the nacelle floor 6 and the hatch arrangements 13 of the uppermost working platform 5 are in a closed state. As will be described later in more detail, the wire 11 is, nonetheless, going through these hatch arrangements 13. The hatch arrangement 13 of the lowermost working platform 5 is in the open state, since the load 8 is desired to be hoisted through the respective opening 7.

Figure 7:
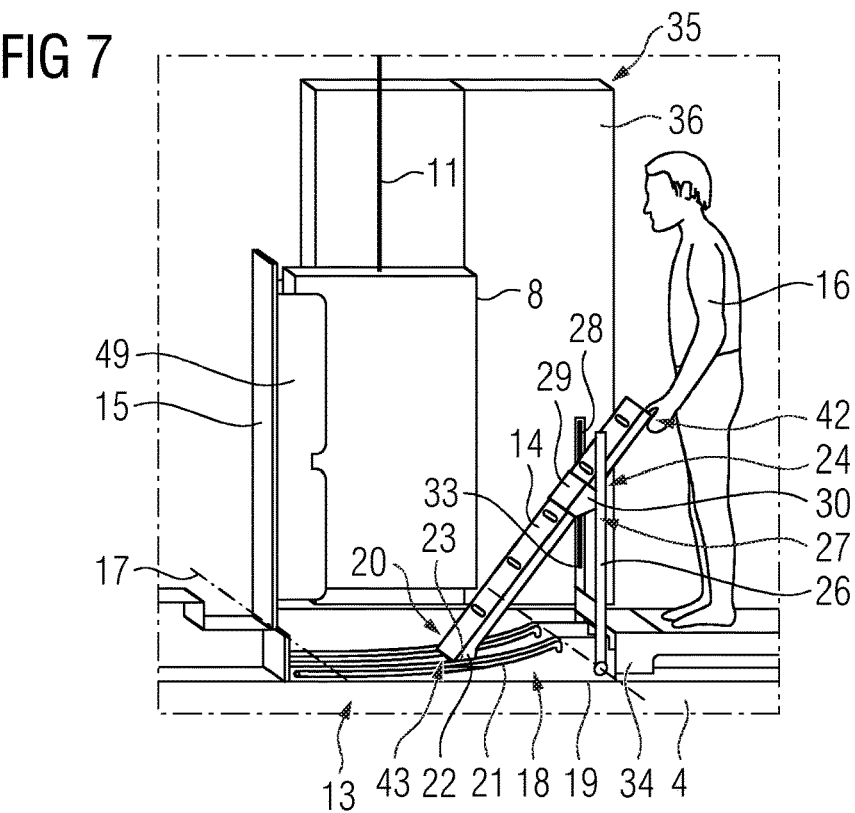
FIG. 7 depicts a sixth part of the process of opening one of the hatch arrangements of the wind turbine according to FIG. 1 in a side view.
Figure 8:
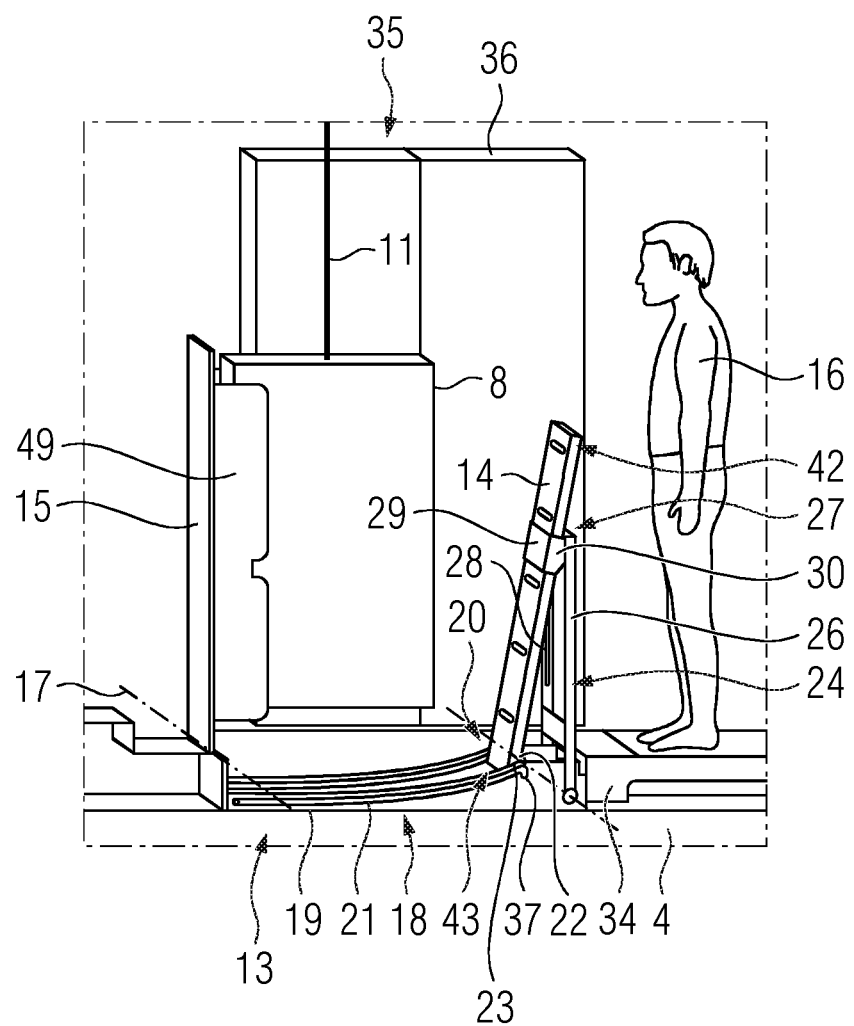
FIG. 8 depicts a seventh part of the process of opening one of the hatch arrangements of the wind turbine according to FIG. 1 in a side view.
Figure 9:
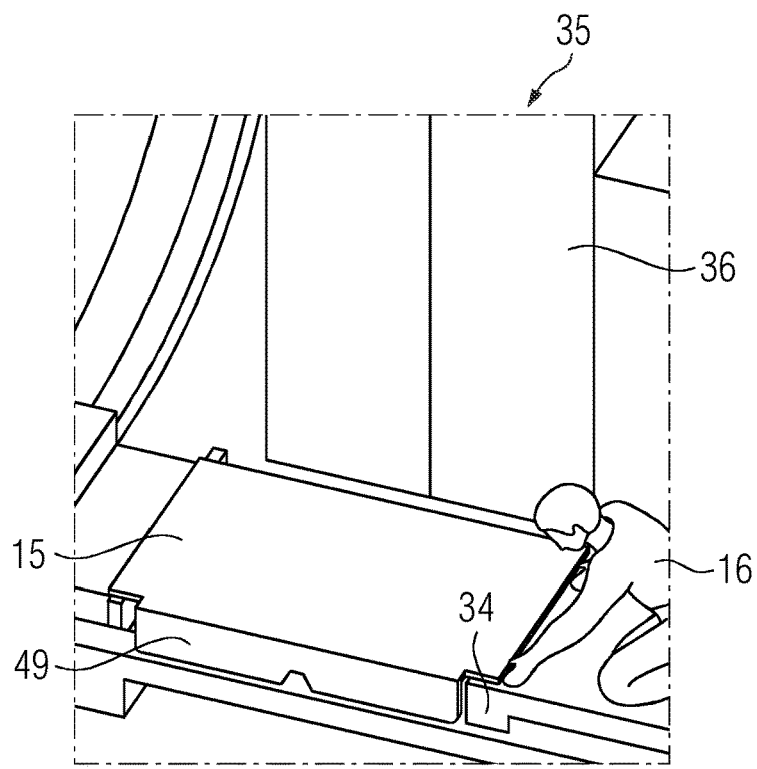
FIG. 9 depicts the first part of the opening process of the hatch arrangement according to FIGS. 2 to 8 in a perspective side view.
Figure 10:
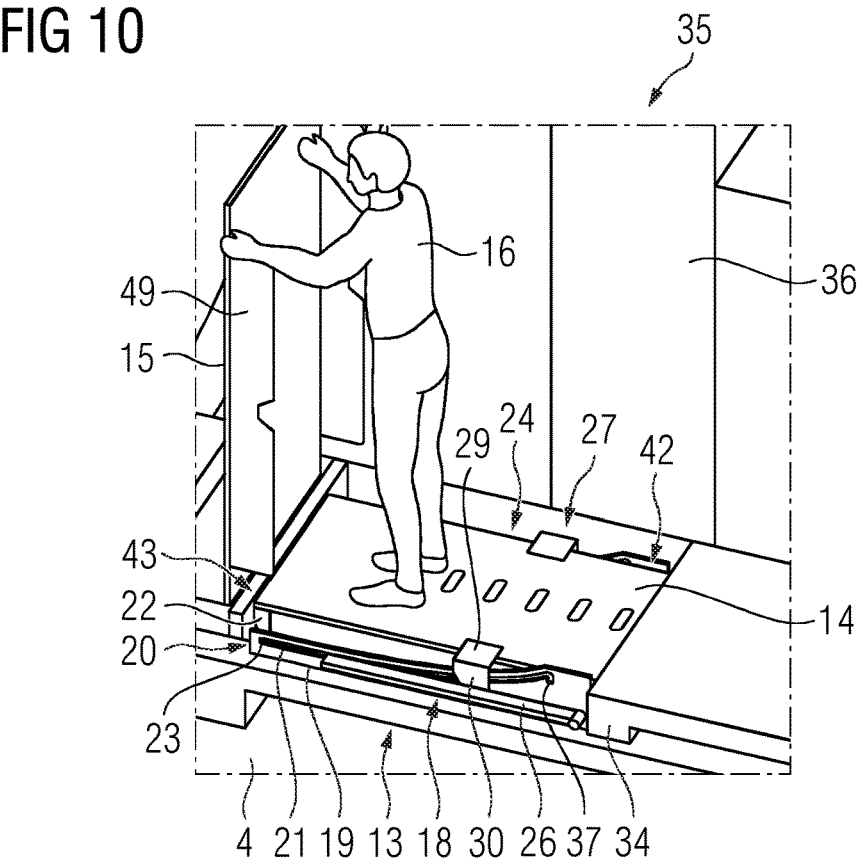
FIG. 10 depicts the second part of the opening process of the hatch arrangement according to FIGS. 2 to 8 in a perspective side view.
Figure 11:
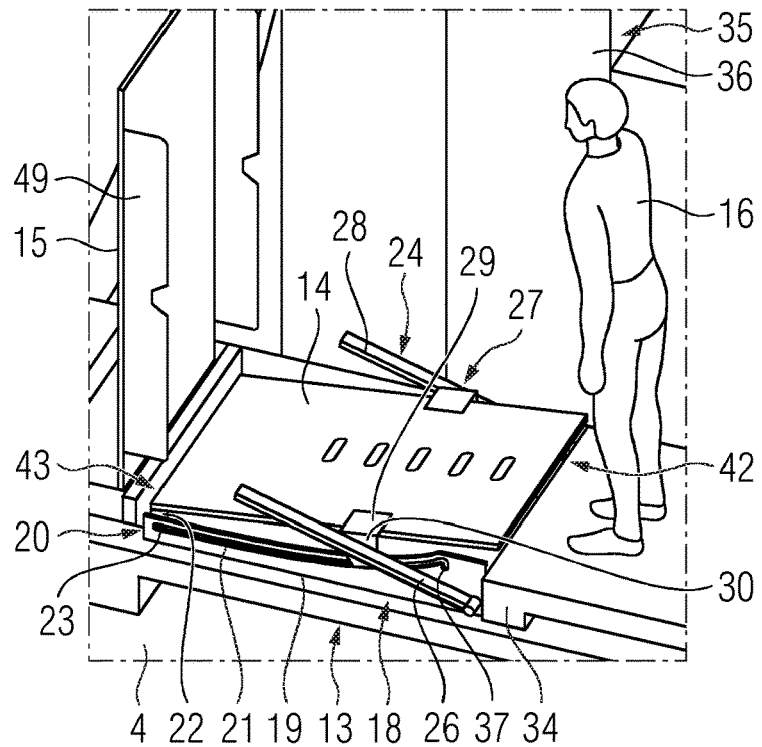
FIG. 11 depicts the third part of the opening process of the hatch arrangement according to FIGS. 2 to 8 in a perspective side view.
Figure 12:
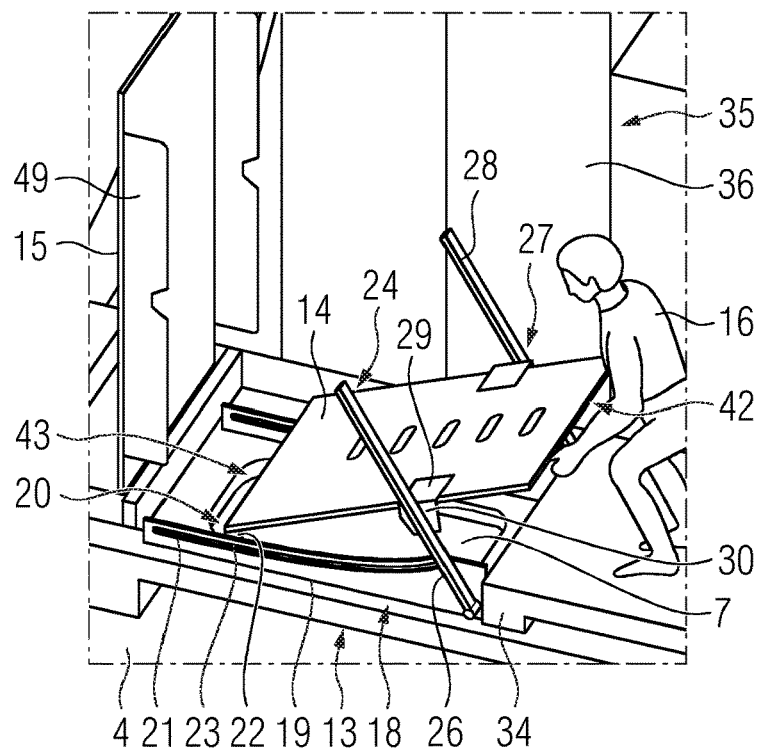
FIG. 12 depicts the fourth part of the opening process of the hatch arrangement according to FIGS. 2 to 8 in a perspective side view.
Figure 13:
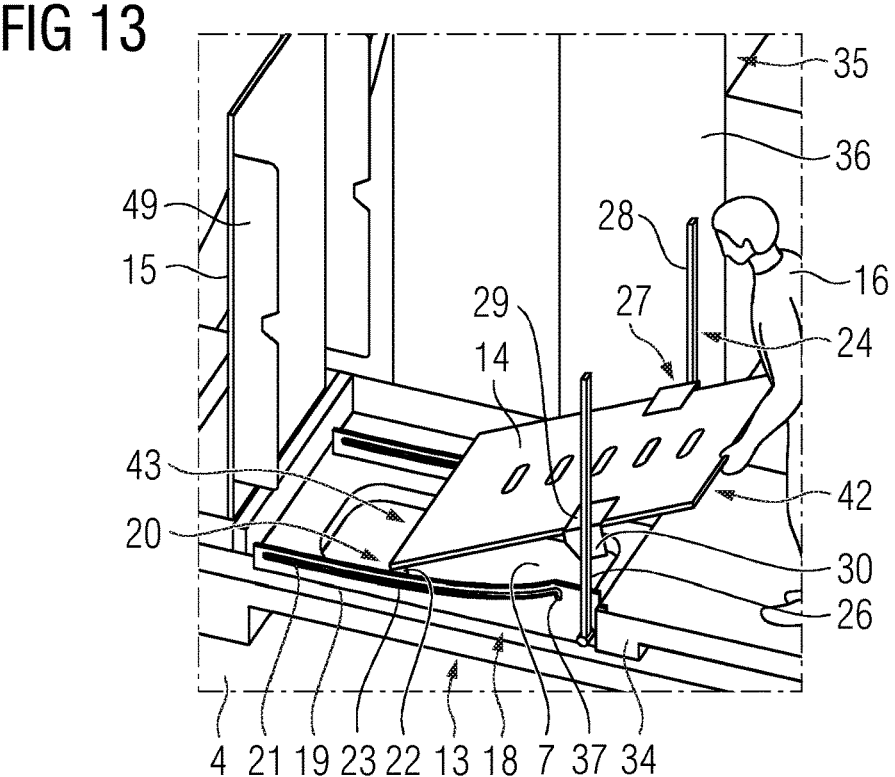
FIG. 13 depicts the fifth part of the opening process of the hatch arrangement according to FIGS. 2 to 8 in a perspective side view.
Figure 14:
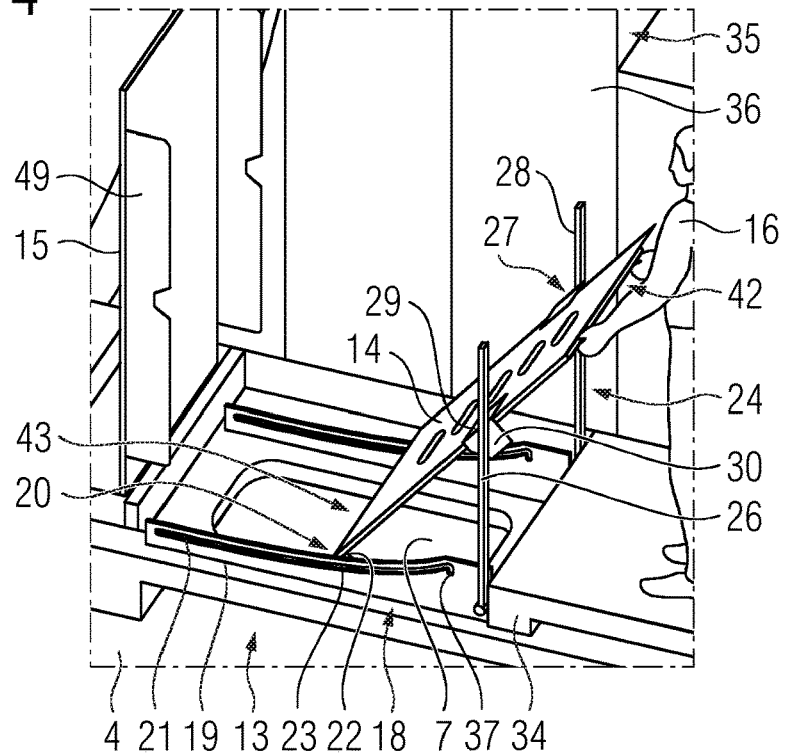
FIG. 14 depicts the sixth part of the opening process of the hatch arrangement according to FIGS. 2 to 8 in a perspective side view.
Figure 15:
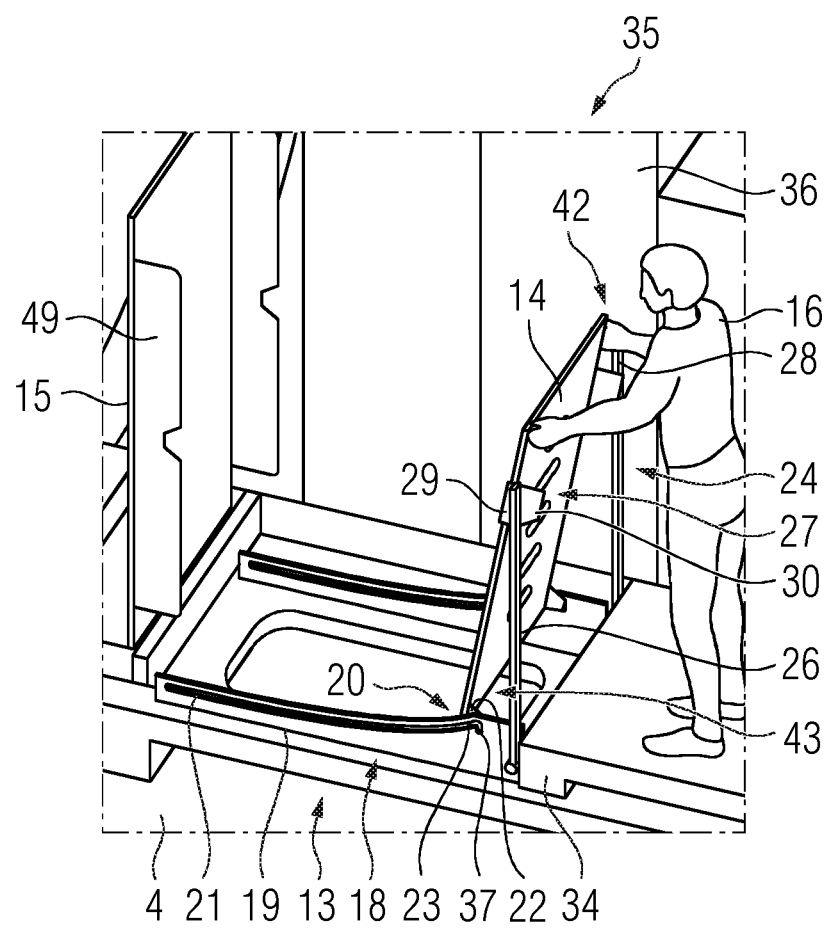
FIG. 15 depicts the seventh part of the opening process of the hatch arrangement according to FIGS. 2 to 8 in a perspective side view.

Next, bringing the hatch arrangement 13 from the closed state into the open state, that is opening the hatch arrangement 13, and the mechanical system will be explained in more detail with the help of FIGS. 2 to 8. FIGS. 9 to 15 show the same opening process of the hatch arrangement 13 from another, perspective point of view. FIG. 9 shows the same situation as FIG. 2, FIG. 10 shows the same situation as FIG. 3 and so on.

The hatch arrangement 13 comprises a slidable hatch 14 and a hinged hatch 15. The hatch arrangement 13 is in the closed state if at least one of the hatches 14, 15 is in a closed position, in particular if both hatches 14, 15 are in the closed position. The hatch arrangement 13 is in the open state if both hatches 14, 15 are in an open position. According to the closed state of the hatch arrangement 13, the slidable hatch 14 is arranged below the hinged hatch 15.

Figure 2:
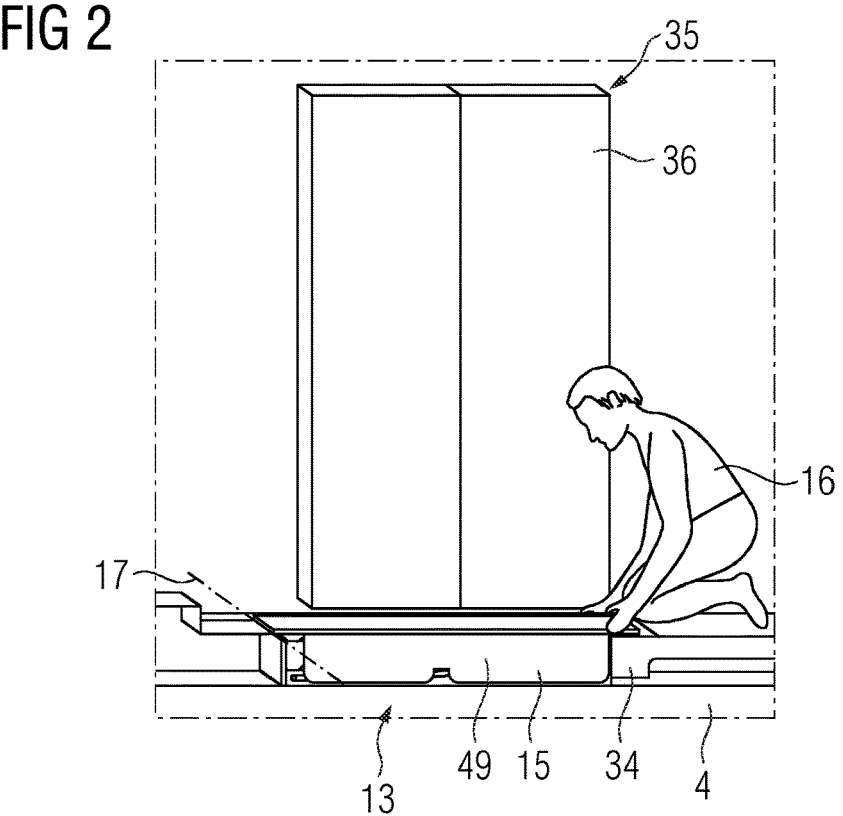
FIG. 2 depicts a first part of the process of opening one of the hatch arrangements of the wind turbine according to FIG. 1 in a side view.

Starting from the hatch arrangement 13 being in the closed state as shown in FIG. 2, a user 16 can open the hinged hatch 15, which is pivotably mounted on the floor 4. To bring the hinged hatch 15 from the closed, namely horizontal or lying, into the open, namely vertical or standing, position and vice versa, the hinged hatch 15 can be pivoted around a pivot axis 17. Since the slidable hatch 14 is in the closed, namely horizontal or lying, position while the hinged hatch 15 is opened by the user 16, the user 16 can step onto the slidable hatch 14 while pivoting the hinged hatch 15 into the open position. After the hinged hatch 15 has been brought into the open position (see FIG. 3) the user 16 can open the slidable hatch 14 to finally bring the hatch arrangement 13 into the open state while the opened hinged hatch 15 provides a security barrier on the other side of the opening 7.

Next, the mechanical components of the hatch arrangement 13 will be described in more detail. The hatch arrangement 13 comprises a first guiding device 18 with exemplarily two hollow first guiding rails 19 which are fixedly mounted parallel to each other on the floor 4 laterally on two opposite sides of the opening 7. The hatch arrangement 13 furthermore comprises a first coupling means 20 to guide the slidable hatch 14 along a first guidance path 21 of the first guiding device 18. The first coupling means 20 exemplarily comprises two first sliders 22 which are arranged on two adjacent corners of the slidable hatch 14, wherein each first slider 22 is movable along one of the first guiding rails 19 and the first guidance path 21, respectively. The first sliders 22 are located in one of the first guiding rails 19 each at a first position 23, wherein the first position 23 is located on a longitudinal axis or direction of the slidable hatch 14. Hence, two first guidance paths 21 are provided, wherein each of the guidance paths 21 is provided for one of the guiding rails 19.

The hatch arrangement 13 furthermore comprises a second guiding device 24, which is pivotably mounted to the floor 4, namely around a pivot axis 25, which is, regarding the opening 7, located on the opposite side of the pivot axis 17 of the hinged hatch 15. The pivot axes 17, 25 are parallel to each other and, hence, perpendicular to the first guidance path 21. The second guiding device 24 comprises exemplarily two second guiding rails 26, which are pivotably mounted on the floor 4 such that the second guiding rails 26 are pivotable around the horizontal pivot axis 25.

The hatch arrangement 13 comprises a second coupling means 27 to couple the slidable hatch 14 with the second guiding device 24. The second coupling means 27 comprises exemplarily two second sliders 30 which are arranged on two opposite sides of the slidable hatch 14, wherein each second slider 30 is movable along one of the second guiding rails 26. The second coupling means 27 couples the slidable hatch 14 pivotably to the second guiding device 24 and guides the slidable hatch 14 along the second guidance path 28 of the second guiding device 24 at a second position 29. Hence, each of the second sliders 30 is movable along the second guidance path 28 of the respective second guiding rail 26.

The positions 23, 29 are located along the longitudinal axis of the slidable hatch 14, wherein the first and the second position 23, 29 are spaced apart from each other.

Next, the first sliders 22 are described in more detail. Each of the first sliders 22 is located within the respective first guiding rail 19, which comprises a U-shaped cross section, wherein each of the two end sections of the U-shaped cross section comprises a lateral protrusion, wherein the two protrusions are facing towards each other to hold the first slider 22 within the first guiding rail 19. The first sliders 22 are rectangular and block-like components which comprise, concerning their surface which faces the opening of the U-shaped cross section of the first guiding rails 19, a bore hole or a bolt to interact with a respective bolt or bore hole of the slidable hatch 14 such that the sliders 22 allow the movement of the slidable hatch 14 along the guiding rails 19 and a pivot motion of the slidable hatch 14 with respect to the first guiding device 18. The position of the first sliders 22 along the first guidance path 21 defines the current coupling location of the first position 23.

Next, the second sliders 30 are described in more detail. Each of the second sliders 30 comprises a protrusion which engages into an undercut longitudinal groove of the respective second guiding device 24. Alternatively, the second slider 30 may comprise protrusions which surround the respective bar- or rod-like second guiding rail 26. The second coupling means 27 furthermore comprises a holding component which is attached to the slidable hatch 14, wherein the holding component is pivotably coupled to the respective slider 30. Hence, using the sliders 30, the slidable hatch 14 can be moved along the second guidance path 28 of the second guiding device 24. Furthermore, the pivotably held sliders 30 allow for the pivot motion of the slidable hatch 14 with respect to the second guiding device 24. The position of the second sliders 30 along the second guidance path 28 defines the current location of the second position 29 with respect to the second guidance path 28.

Figure 4:
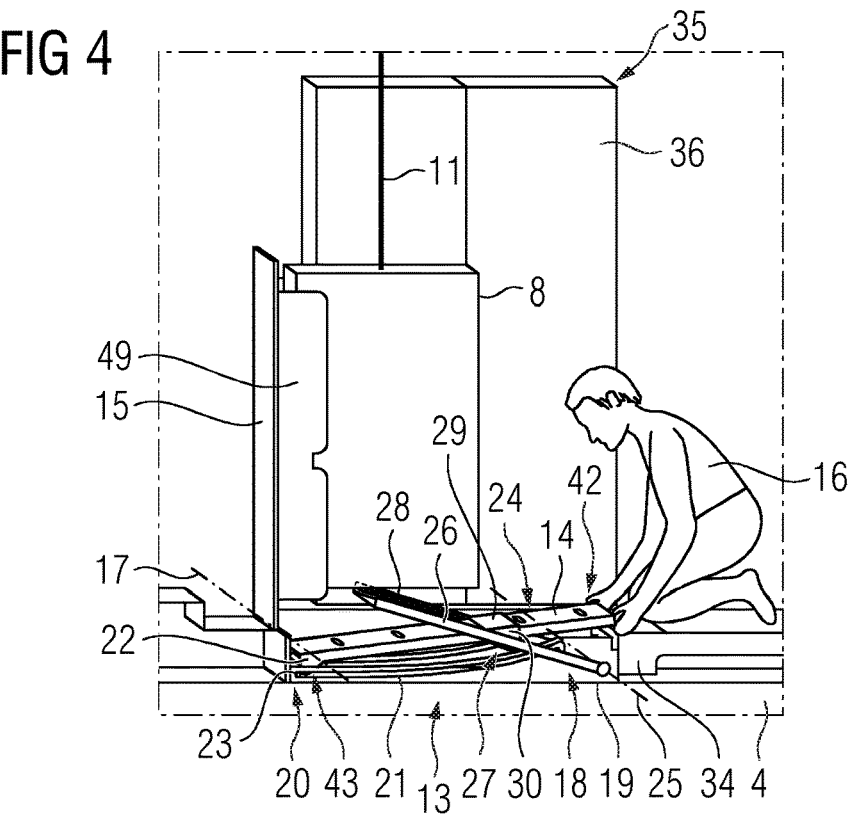
FIG. 4 depicts a third part of the process of opening one of the hatch arrangements of the wind turbine according to FIG. 1 in a side view.
Figure 5:
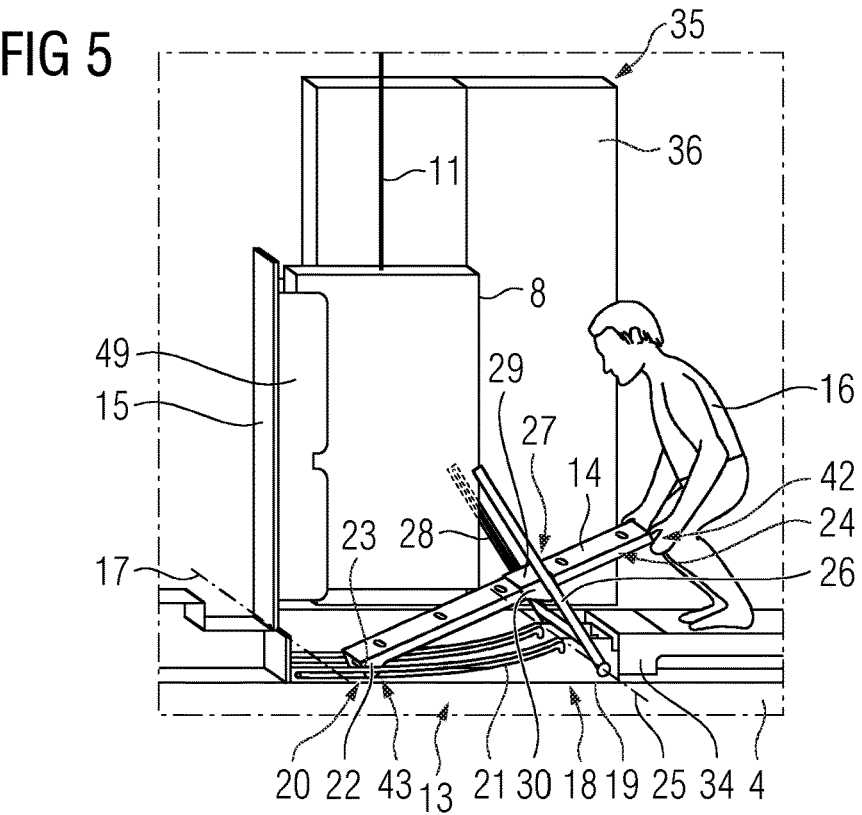
FIG. 5 depicts a fourth part of the process of opening one of the hatch arrangements of the wind turbine according to FIG. 1 in a side view.
Figure 6:
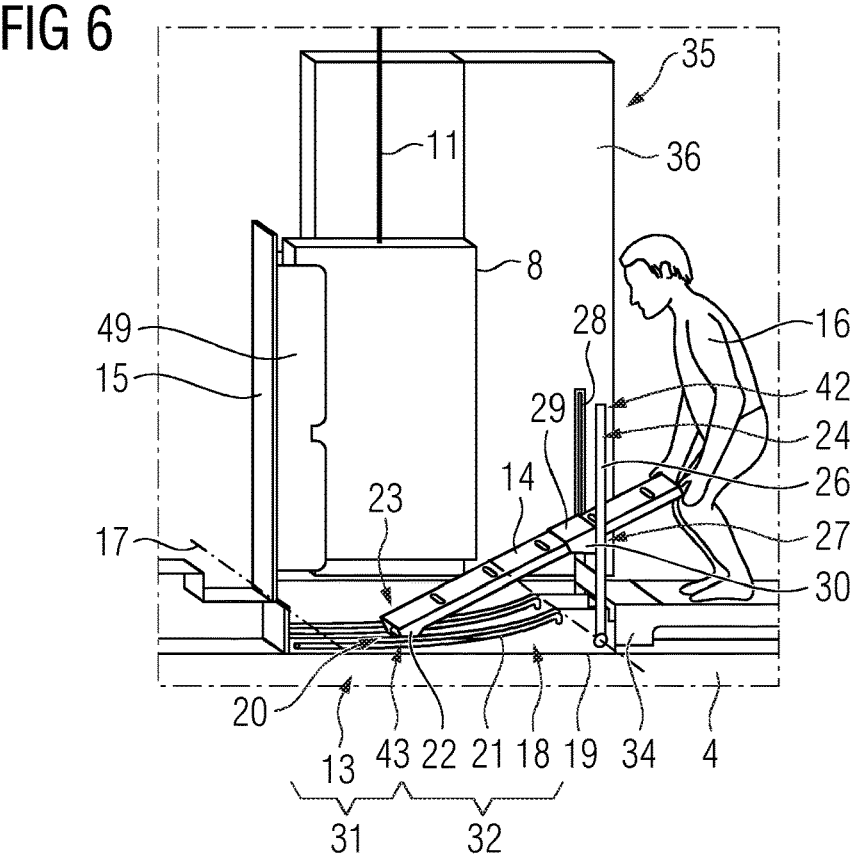
FIG. 6 depicts a fifth part of the process of opening one of the hatch arrangements of the wind turbine according to FIG. 1 in a side view.

Next, bringing the slidable hatch 14 from the closed, namely horizontal or lying, position (see FIG. 3) into the open, namely vertical or standing, position (see FIG. 8) will be described in more detail. This can be performed by the user 16 by pulling the slidable hatch 14 into the open position. The first guidance path 21 is divided into two subsequent sections, namely a first section 31 and a second section 32. As can be seen in FIGS. 3 to 6, the movement of the slidable hatch 14 from the closed position along the first section 31 of the first guidance path 21 mainly results in a pivoting movement of the second guiding device 24. As can be seen in FIGS. 6 to 8, the subsequent movement of the slidable hatch 14 along the second section 32 of the first guidance path 21 mainly results in a pivoting movement of the slidable hatch 14 into the open position.

Figure 3:
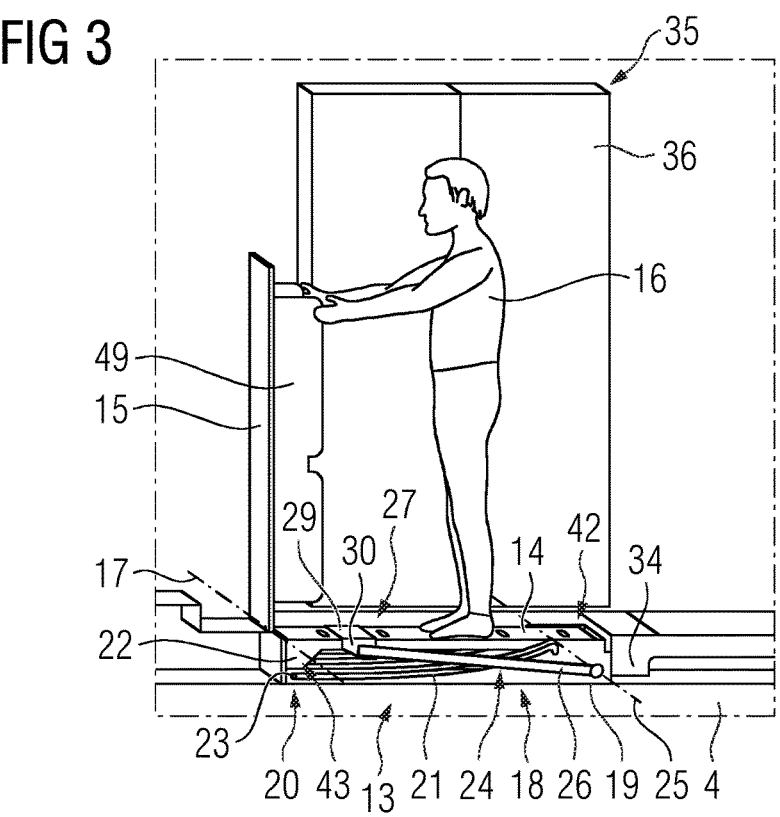
FIG. 3 depicts a second part of the process of opening one of the hatch arrangements of the wind turbine according to FIG. 1 in a side view.

Next, the movement of the slidable hatch 14 along the sections 31, 32 will be described in more detail. Starting from the closed position, the movement of the slidable hatch 14 and, hence, of the first sliders 22 along the first section 31 results in a transmission of force from the slidable hatch 14 to the second guiding device 24. While the hinged hatch 14 moves along the first section 31, the second coupling means 27 is located at an end stop 33 of the second guidance path 28. The end stop 33 is the end of the second guidance path 28 which faces the pivot axis 25. Since the angle between the force and the free direction of the second guidance path 28 is, in particular in the situations as shown in FIGS. 3 to 5, larger than 90°, the second sliders 30 are pressed against the end stop 33 which causes the second device 24 to pivot from a first, namely horizontal or lying, orientation (FIG. 3) into a second, namely vertical or standing, orientation (FIGS. 6 to 8), while the second position 29 or second slider 30, respectively, remains at the end stop 33. Even if the angle between the force and the free direction of the second guiding path 28 becomes smaller than 90°, the gravitational force of the hinged hatch 14 is large enough to keep the second position 29 at the end stop 33.

During the movement of the slidable hatch 14 along the first section 31, the slidable hatch 14 moves towards the user 16 who, as a consequence, has to step back while opening the slidable hatch 14. This increases the distance between the user 16 and the opening 7, reducing the risk of the user 16 falling down into the opening 7.

The hatch arrangement 13 comprises a stopper 34 which defines the second orientation of the second guiding device 24. At the second orientation, the stopper 34 blocks the second guiding device 24 with respect to its pivoting movement. In other words, the stopper 34 defines the end of the first section 31 and the beginning of the second section 32. Once the second guiding device 24 has reached the second orientation (see FIG. 6), the subsequent movement of the slidable hatch 14 along the second section 32 of the first guidance path 21 begins. This movement results in a movement of the second coupling means 27 along the second guidance path 28. During this movement, the second guiding device 24 remains in the second orientation, which is shown in FIGS. 6 to 8. During the movement of the slidable hatch 14 along the second section 32 of the first guidance path 21, the slidable hatch 14 mainly pivots into the vertical position. Hence, the slidable hatch 14 acts as a safety barrier, opposing the barrier formed by the open hinged hatch 15, preventing the user 16 from falling down through the opening.

However, as can be seen from FIGS. 3 and 4, large loads 8 can already be placed above the opening 7 while the slidable hatch 14 is still in the closed position. As can be seen from FIGS. 4 to 6, while using the first section 31 of the first guidance path 21, the slidable hatch 14 slides away under the load 8, not gaining much height and providing a large available space for loads, since most of the pivoting of the slidable hatch 14 into the open position takes place at the side of the opening 7 while using the second section 32 and the second guidance path 28.

Although only the opening process of the hatches 14, 15 has been described on the basis of FIGS. 2 to 15, the closing processes can be performed analogously.

Now referring to FIG. 8, where the hatch arrangement 13 is in the open state, on two opposite sides of the opening 7 the slidable hatch 14 and the hinged hatch 15, which are in the open position each, are located. Regarding these two sides, the hatches 14, 15 act as a prevention means to prevent people or objects from falling down through the opening 7 from the respective sides or direction. On each of the two other opposing sides, a component 35 of the wind turbine 1 is located, wherein each of the components 35 prevent persons or objects from falling into the opening 7 from the respective side. Note that in FIGS. 2 to 15 only one of the components 35 is shown. The components 35 are exemplarily electric cubicles 36 of the wind turbine 1. From the view of the user 16, his side is secured by the slidable hatch 14 and the other three sides are secured by the electrical cubicles 36 and the hinged hatch 15. Hence, the components 35 and the hatches 14, 15 replace guiding rails, which typically have to be mounted at the opening 7 to prevent objects or people from falling down.

To avoid remaining open gaps between the components 35 of the wind turbine 1 and the hinged hatch 15 being in the open position, the hinged hatch 15 exemplarily comprises two lateral side walls 49 to close these gaps. To close these gaps completely, the side walls 49 have a width of exemplarily 20 centimetres. In the closed position of the hinged hatch 15, the side walls 49 laterally cover the other components of the hatch arrangement, in particular the slidable hatch 14 and the guiding devices 18, 24.

Another advantage of the hatch arrangement 13 concerns the load 8. After the hinged hatch 15 has been opened, the load 8 can be brought over the opening 7 using the crane 10. As can be seen in FIGS. 4 to 8, the movement of the slidable hatch 14 allows the load 8 to be positioned closely above the opening 7. If, like in many traditional systems, only the hinged hatch 15 would be provided, there would not be enough space to locate the load 8 that close upon the opening 7 before opening the hinged hatch 15. In these systems, the load 8 has to be hoisted over the hinged hatch 15 in the open state or over the respective guiding rails, which have to be mounted before opening the hinged hatch 15. Hence, the crane 10 has to be much higher or larger than in the present invention. In the shown embodiment of the present invention, this concerns in particular the nacelle 3 of the wind turbine 1, where the crane 10 is located. Basically, further cranes can be provided on other floors 4 than the nacelle floor 6.

Figure 16:
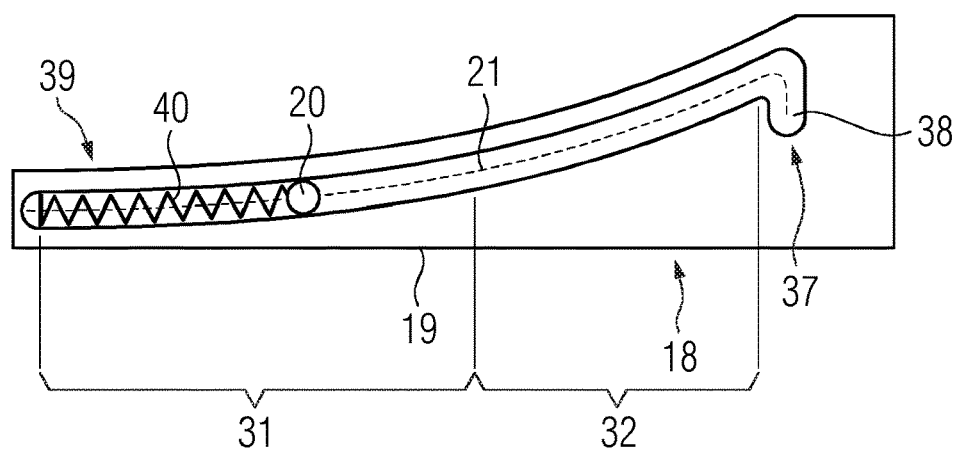
FIG. 16 depicts a vertical cut through a first guiding device of the hatch arrangement according to the previous figures.
Figure 17:
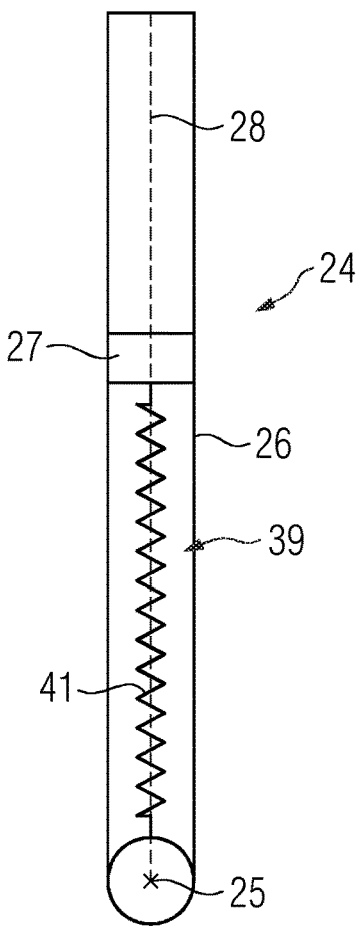
FIG. 17 depicts a vertical cut through a second guiding device of the hatch arrangement according to the previous figures.

Another aspect of the hatch arrangement 13 is explained in FIGS. 16 and 17. As can be seen in FIG. 16, the hatch arrangement 13 or the first guiding device 18, respectively, comprises a holding means 37, wherein the holding means 37 is adapted to hold the slidable hatch 14 in the open position. The holding means 37 is a U-shaped lateral recess 38 of the first guidance path 21. Once the slidable hatch 14 is in the open position, the first coupling means latches into the lateral recess 38. To close the slidable hatch 14 again, the user 16 has to lift the slidable hatch 14 a bit and push against the slidable hatch 14 with his foot. Alternatively, the holding means 37 can be a clamping means.

A further holding means, although not shown in the figures, is exemplarily provided for the hinged hatch 15. The further holding means is a clamping means to releasably clamp a pivot joint of the hinged hatch 15 at the pivot axis 17. Additionally or alternatively, the hinged hatch 15 can be held by its own gravity in the open position, which is, e.g., realised by an angle between the hinged hatch 15 and the floor 4 of larger than 90°, e.g. of 100°, if the hinged hatch 15 is in the open position.

FIG. 16 shows another aspect concerning the first guiding device 18. The hatch arrangement 13 comprises an elastic means 39 with a first spring 40 which is arranged at or in the first guiding rail 19. While closing the slidable hatch 14, the first spring 40 deforms elastically against the elastic force of the first spring 40. One end side of the first spring 40 is located at the first coupling means 20 and the other end side is located at the end stop of the first guiding rail 19 which is opposed to the holding means 37.

The elastic means 39, as depicted in FIG. 17, comprises a second spring 41, which is located at the second guiding device 24. One end side of the second spring 41 is located at the second coupling means 27 and the other end side is located, regarding the second orientation of the second guiding device 24, at the lower end of the second guidance path 28. Closing the slidable hatch 14, hence, leads to an elastic deformation of the second spring 41 against the elastic force of the second spring 41.

As a consequence, when closing the slidable hatch 14, a certain portion of the potential energy of the slidable hatch 14 and of the second guiding device 24 is stored in the first spring 40 and the second spring 41. As a consequence, the movement of the slidable hatch 14 while closing it is softer compared to the case when no elastic means 39 is provided. Furthermore, the energy stored in the elastic means 39 supports the user 16 when opening the hinged hatch 14 by pulling it on its, regarding the open position, upper side 42 which is opposed to the lower side 43.

The properties of the elastic means 39, in particular the spring stiffness of the springs 40, 41 are chosen such that after initiating the closing of the slidable hatch 14, the slidable hatch 14 automatically changes from the open into the closed position.

Although not shown in the figures, the hinged hatch 15 of the hatch arrangement 13 comprises a further elastic means, wherein closing the hinged hatch 15 leads to an elastic deformation of the further elastic means against the elastic force of the further elastic means. The further elastic means is exemplarily a leg spring which is located at the pivot axis 17 of the hinged hatch 15.

Alternatively, a, in particular electrical and/or hydraulic, driving means can be provided to bring the slidable hatch 14 and/or the hinged hatch 15 from the closed position into the open position and vice versa.

Figure 18:
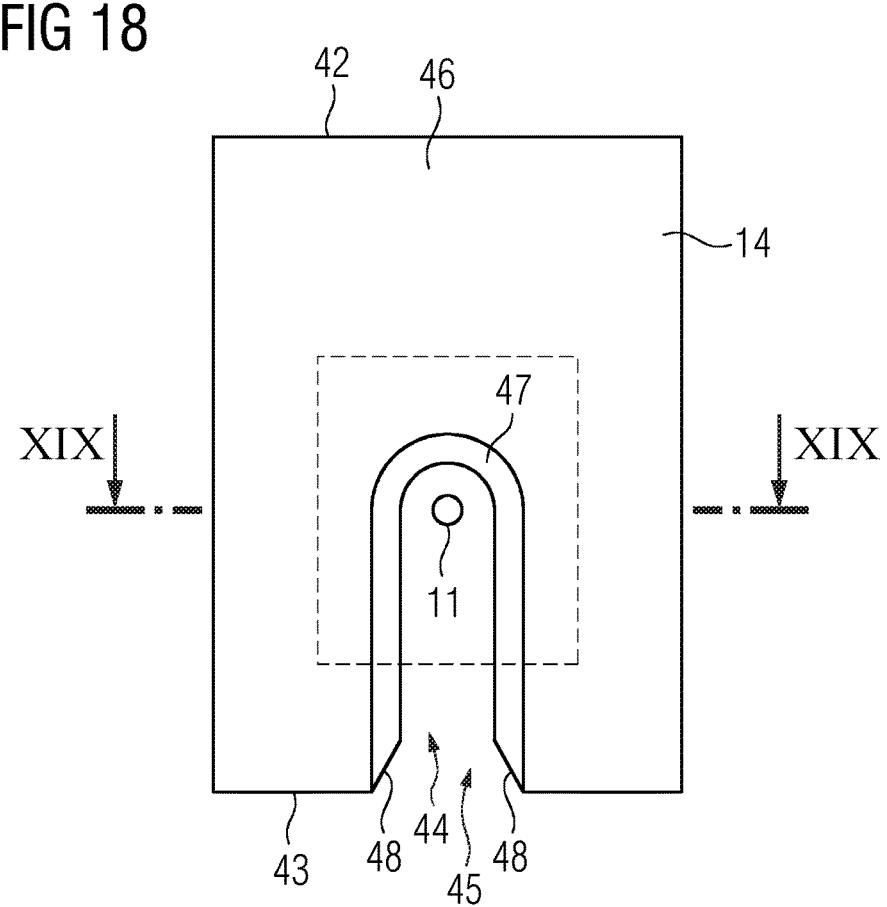
FIG. 18 depicts a detailed view of a slidable hatch of the hatch arrangement according the previous figures.
Figure 19:
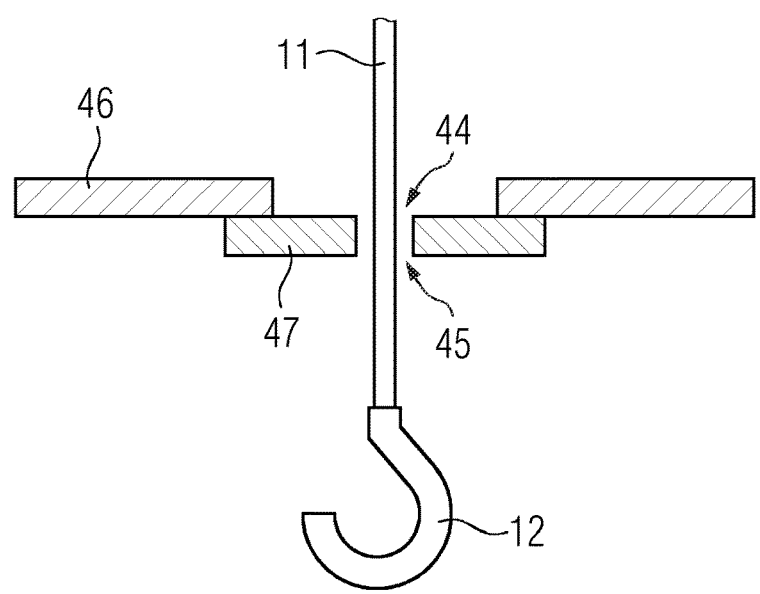
FIG. 19 depicts a sectional view along the line XIX-XIX in FIG. 18.

Another aspect of the hinged hatch 14 is shown in FIGS. 18 and 19, wherein FIG. 19 shows a sectional view through the slidable hatch 14 along the line XIX-XIX in FIG. 18. The slidable hatch 14 comprises a hatch opening 44 on the lower side 43. The opening 43 allows the wire 11 to go through the slidable hatch 14 in the closed position. The hatch opening 44 is a lateral slit 45 allowing the hinged hatch 14 to be opened and closed while the wire 11 passes through the hatch opening 44. The lateral slit 45 can be cut into a cover blade 46 of the slidable hatch 14 which particularly consists of steel or grated steel. The slidable hatch 14 comprises a preserving means 47, which consists of a, in particular replaceable, soft material like a rubber or another synthetic material such as a plastic material. The preserving means 47 avoids the wire 11 from scratching directly against the metal of the cover plate 46 during operation. The lateral slit 45 can have a width, regarding the preserving means 47, of 30 mm and, regarding the cover plate 46, of 50 mm. The cover plate 46 can have a thickness of 4 mm. The lateral slit 45 of the preserving means 47 can comprise an oblique tread 48 for an easy insertion of the wire 11 into the lateral slit 45 while closing the slidable hatch 14.

Although not explicitly shown in the figures, the hinged hatch 15 also comprises a hatch opening, namely a lateral slit on its, regarding the open position, upper side, and a preserving means. The hatch opening and the preserving means of the hinged hatch 15 act analogously to the hatch opening 44 and the preserving means 47 of the slidable hatch 14.

The hatch opening 44 of the slidable hatch 14 and the hatch opening of the hinged hatch 15 allows the wire 11 to go through the respective hatch 14, 15, even if the hatches 14, 15 are in the closed position, like it is shown for the uppermost two hatch arrangements 13 in FIG. 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A hatch arrangement with at least one slidable hatch for closing an opening in a floor of a wind turbine, the hatch arrangement comprising:
   a first guiding device which is fixedly mountable to the floor;
   a second guiding device which is pivotably mountable to the floor;
   a first coupling means to guide the at least one slidable hatch along a first guidance path in the first guiding device and a second coupling means to couple the at least one slidable hatch at least pivotably to the second guiding device; and
   a hinged hatch which is pivotably mountable to the floor, wherein the hinged hatch can be brought from a closed position into an open position and vice versa by pivoting the hinged hatch around a pivot axis of the hinged hatch, further wherein the at least one slidable hatch and the hinged hatch are, if both in the open position, located on opposite sides of the opening;
   wherein the at least one slidable hatch is coupled to the first guiding device at a first position and to the second guiding device at a second position, the first position and the second position being located along a longitudinal direction of the at least one slidable hatch and spaced apart from each other;
   wherein a movement of the at least one slidable hatch from a closed position along the first guidance path results in a pivoting movement of the second guiding device and in a movement of the at least one slidable hatch to an open position and vice versa.

2. The hatch arrangement according to claim 1, wherein the second guiding device comprises a second guidance path, and the second coupling means is further adapted to guide the at least one slidable hatch along the second guidance path at the second position.

3. The hatch arrangement according to claim 2, wherein the first guidance path comprises a first section and a second section, and a movement of the at least one slidable hatch along the first section from the closed position results in a transmission of force from the at least one slidable hatch to the second guiding device using the second coupling means which is located at an end stop of the second guidance path, further wherein the force causes the second guiding device to pivot from a first orientation into a second orientation, further wherein the hatch arrangement comprises a stopper which defines the second orientation as the position where the stopper blocks the second guiding device with respect to the pivoting movement, further wherein the movement of the at least one slidable hatch along the second section results in a movement of the second coupling means along the second guidance path while the second guiding device remains in the second orientation.

4. The hatch arrangement according to claim 2, wherein the second guiding device comprises two second guiding rails which are pivotably mountable on the floor such that the second guiding rails are pivotable around a horizontal pivot axis, which is perpendicular to the first guidance path, further wherein the second coupling means comprises two second sliders arranged on two opposite sides of the slidable hatch, wherein each second slider is movable along one of the second guiding rails.

5. The hatch arrangement according to claim 1, wherein the first guiding device comprises two hollow first guiding rails which are fixedly mountable parallel to each other laterally on two opposite sides of the opening, further wherein the first coupling means comprises two first sliders which are arranged on two adjacent corners of the slidable hatch, and each first slider is movable along one of the first guiding rails.

6. The hatch arrangement according to claim 1, wherein, if the at least one slidable hatch and the hinged hatch are both in the closed position, the at least one slidable hatch is arranged below the hinged hatch.

7. The hatch arrangement according to claim 1, wherein the at least one slidable hatch comprises a hatch opening for a wire in the closed position.

8. The hatch arrangement according to claim 1, further comprising at least one elastic means in or at the first guiding device and/or the second guiding device, wherein closing the at least one slidable hatch leads to an elastic deformation of the at least one elastic means against an elastic force of the at least one elastic means.

9. The hatch arrangement according to claim 1, further comprising a holding means configured to hold the at least one slidable hatch in the open position.

10. A wind turbine comprising at least one hatch arrangement according to claim 1.

11. The wind turbine according to claim 10, wherein the opening is arranged on a floor of a nacelle and/or on a platform within a tower of the wind turbine.

12. The wind turbine according to claim 10, wherein the at least one slidable hatch and the hinged hatch are located on two opposite sides of the opening, further wherein on each of the two other opposing sides a component of the wind turbine is located, wherein each of the components prevents a user from falling into the opening from the respective side.

13. A hatch arrangement with at least one slidable hatch for closing an opening in a floor of a wind turbine, the hatch arrangement comprising:
 a first guiding device which is fixedly mountable to the floor;
 a second guiding device which is pivotably mountable to the floor; and
 a first coupling means to guide the at least one slidable hatch along a first guidance path in the first guiding device and a second coupling means to couple the at least one slidable hatch at least pivotably to the second guiding device;
 wherein the at least one slidable hatch is coupled to the first guiding device at a first position and to the second guiding device at a second position, the first position and the second position being located along a longitudinal direction of the at least one slidable hatch and spaced apart from each other;
 wherein a movement of the at least one slidable hatch from a closed position along the first guidance path results in a pivoting movement of the second guiding device and in a movement of the at least one slidable hatch to an open position and vice versa;
 wherein the at least one slidable hatch comprises a hatch opening for a wire in the closed position.

14. A hatch arrangement with at least one slidable hatch for closing an opening in a floor of a wind turbine, the hatch arrangement comprising:
 a first guiding device which is fixedly mountable to the floor;
 a second guiding device which is pivotably mountable to the floor; and
 a first coupling means to guide the at least one slidable hatch along a first guidance path in the first guiding device and a second coupling means to couple the at least one slidable hatch at least pivotably to the second guiding device;
 wherein the at least one slidable hatch is coupled to the first guiding device at a first position and to the second guiding device at a second position, the first position and the second position being located along a longitudinal direction of the at least one slidable hatch and spaced apart from each other;
 wherein a movement of the at least one slidable hatch from a closed position along the first guidance path results in a pivoting movement of the second guiding device and in a movement of the at least one slidable hatch to an open position and vice versa;
 wherein the first guiding device comprises two hollow first guiding rails which are fixedly mountable parallel to each other laterally on two opposite sides of the opening, further wherein the first coupling means comprises two first sliders which are arranged on two adjacent corners of the slidable hatch, and each first slider is movable along one of the first guiding rails.

* * * * *